United States Patent
Hobbs

(10) Patent No.: US 10,015,499 B1
(45) Date of Patent: Jul. 3, 2018

(54) METHOD AND APPARATUS FOR LAYERED WAVELET IMAGE COMPRESSION

(71) Applicant: Teradici Corporation, Burnaby (CA)

(72) Inventor: David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 168 days.

(21) Appl. No.: 15/223,958

(22) Filed: Jul. 29, 2016

Related U.S. Application Data

(60) Provisional application No. 62/199,147, filed on Jul. 30, 2015.

(51) Int. Cl.
- *G06K 9/36* (2006.01)
- *H04N 19/18* (2014.01)
- *H04N 19/176* (2014.01)

(52) U.S. Cl.
CPC .......... *H04N 19/18* (2014.11); *H04N 19/176* (2014.11)

(58) Field of Classification Search
CPC ...... H04N 19/18; H04N 19/176; H04N 19/12; H04N 19/136; H04N 19/17; H04N 19/182; H04N 19/186; H04N 19/20; H04N 19/93
USPC ....................................................... 382/232
See application file for complete search history.

(56) References Cited

U.S. PATENT DOCUMENTS

| | | | |
|---|---|---|---|
| 6,233,357 B1 | 5/2001 | Li et al. | |
| 7,565,020 B2 * | 7/2009 | Wu | H04N 19/63 382/232 |
| 7,577,307 B2 * | 8/2009 | Hou | H04N 19/63 382/232 |
| 8,036,473 B1 | 10/2011 | Ratto et al. | |
| 8,311,115 B2 * | 11/2012 | Gu | H04N 19/105 375/240.01 |
| 8,411,942 B2 * | 4/2013 | Chen | H04N 19/12 382/166 |
| 2003/0185454 A1 | 10/2003 | Simard et al. | |
| 2005/0131660 A1 * | 6/2005 | Yadegar | G06T 9/001 703/2 |

(Continued)

OTHER PUBLICATIONS

Bottou et al., "Lossy Compression of Partially Masked Still Images", Data Compression Conference, Snowbird, UT, Apr. 1, 1998.

(Continued)

*Primary Examiner* — Mekonen Bekele
(74) *Attorney, Agent, or Firm* — Moser Taboada

(57) ABSTRACT

A method for transmitting a computer display image. In one embodiment, the method comprises determining a pixel boundary, referenced to a sub-tile boundary within a grid of tiles, for a changed portion of the image; identifying i) a uniform tile within the changed portion referenced to a first tile and ii) at least one hybrid sub-tile, associated with the sub-tile boundary, within the changed portion referenced to a second tile adjacent the first tile; engaging an SIMD vector processor to transform the uniform tile to an exit matrix, transform the at least one hybrid sub-tile to at least one DC coefficient, and transform the exit matrix to a first DC coefficient and the at least one DC coefficient to a second DC coefficient; quantizing, encoding and transmitting coefficients of the first and second tiles; and transmitting a binary mask specification for the changed portion adjusted to the sub-tile boundary.

20 Claims, 10 Drawing Sheets

(56) References Cited

U.S. PATENT DOCUMENTS

| | | | | |
|---|---|---|---|---|
| 2006/0008164 A1* | 1/2006 | Wu | ............... | H04N 19/147 382/240 |
| 2006/0038705 A1* | 2/2006 | Brady | ............... | G06T 9/00 341/123 |
| 2006/0133690 A1* | 6/2006 | Bloomberg | ............... | H04N 1/41 382/269 |
| 2008/0144952 A1* | 6/2008 | Chen | ............... | H04N 19/12 382/239 |

OTHER PUBLICATIONS

Li et al., "Shape Adaptive Discrete Wavelet Transforms for Arbitrarily Shaped Visual Object Coding", IEEE Transaction on Circuits and System for Video Technology, vol. 10, Issue 5, Aug. 2000.

Simard et al., "A Wavelet Coder for Masked Images", Data Compression Conference, Snowbird, UT, Mar. 2001.

Tseng et al., "VLSI Implementation of Shape-Adaptive Discrete Wavelet Transform", Visual Communications and Image Processing, CA, USA, pp. 655-666, Jan. 7, 2002.

Mukherjee et al., "JPEG2000-Matched MRC Compression of Compound Documents", IEEE International Conference on Image Processing, Rochester, New York, USA, vol. 3, Sep. 22-25, 2002.

Gaubatz et al., "Spatially-Adaptive wavelet Image Compression via Structural Masking", International Conference on Image Processing, Atlanta, GA, pp. 1897-1900, 2006.

Maheswari et al., "Enhanced Hybrid Compound Image Compression Algorithm Combining Block and Layer-based Segmentation", The International Journal of Multimedia & Its Applications (IJMA), India, vol. 3, Issue 4, pp. 119-131, Nov. 2011.

Banarase et al., "Application of Wavelet Transform on Multiresolution Image Mosaicing", International Journal of Advanced Research in Electronics and Communication Engineering (IJARECE), India, vol. 2, Issue 1, pp. 64-69, Jan. 2013.

* cited by examiner

METHOD AND APPARATUS FOR LAYERED WAVELET IMAGE COMPRESSION

CROSS-REFERENCE TO RELATED APPLICATIONS

This application claims benefit of U.S. provisional patent application Ser. No. 62/199,147, entitled "Method and Apparatus for Continuous DWT Encoding of a Desktop Image" and filed Jul. 30, 2015, which is herein incorporated in its entirety by reference.

BACKGROUND OF THE INVENTION

Field of the Invention

Embodiments of the present invention relate generally to a method and apparatus for encoding a desktop display image.

Description of the Related Art

The JPEG200 specification describes a wavelet image compression technique whereby a source image is partitioned into tiles and each tile is separately subjected to a wavelet transform process. A problem with such an approach is that the decoded image is subject to blocking artifacts visible at tile boundaries. Full frame processing of the source image mitigates such distortions but full frame processing is unsuitable for mixed content source images such as computer desktop display images. The compression techniques best suited for such images are dictated by image content type and image recent change status. Text content is better suited to spatial domain coding than frequency domain coding and it is inefficient to recompress and retransmit unchanged areas of a desktop display image. One solution to mitigating blocking artifacts involves over-scan of the pixel areas of candidate compression tiles which eliminates artifacts related to reflecting coefficients at block boundaries. However, efficient vectorization and processing of a selection of candidate tiles spread arbitrarily over a desktop display remains problematic, particularly in cases where it is desired to maximize the data parallelism offered by vector processing extensions offered by modern processors. Therefore there is a need in the art for a wavelet-based processing technique suitable for mixed content images and architected for improved performance when using vector processing extensions.

SUMMARY OF THE INVENTION

Embodiments of the present invention generally relate to a method and apparatus for encoding a desktop display image substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

Introduction

Figure 1:
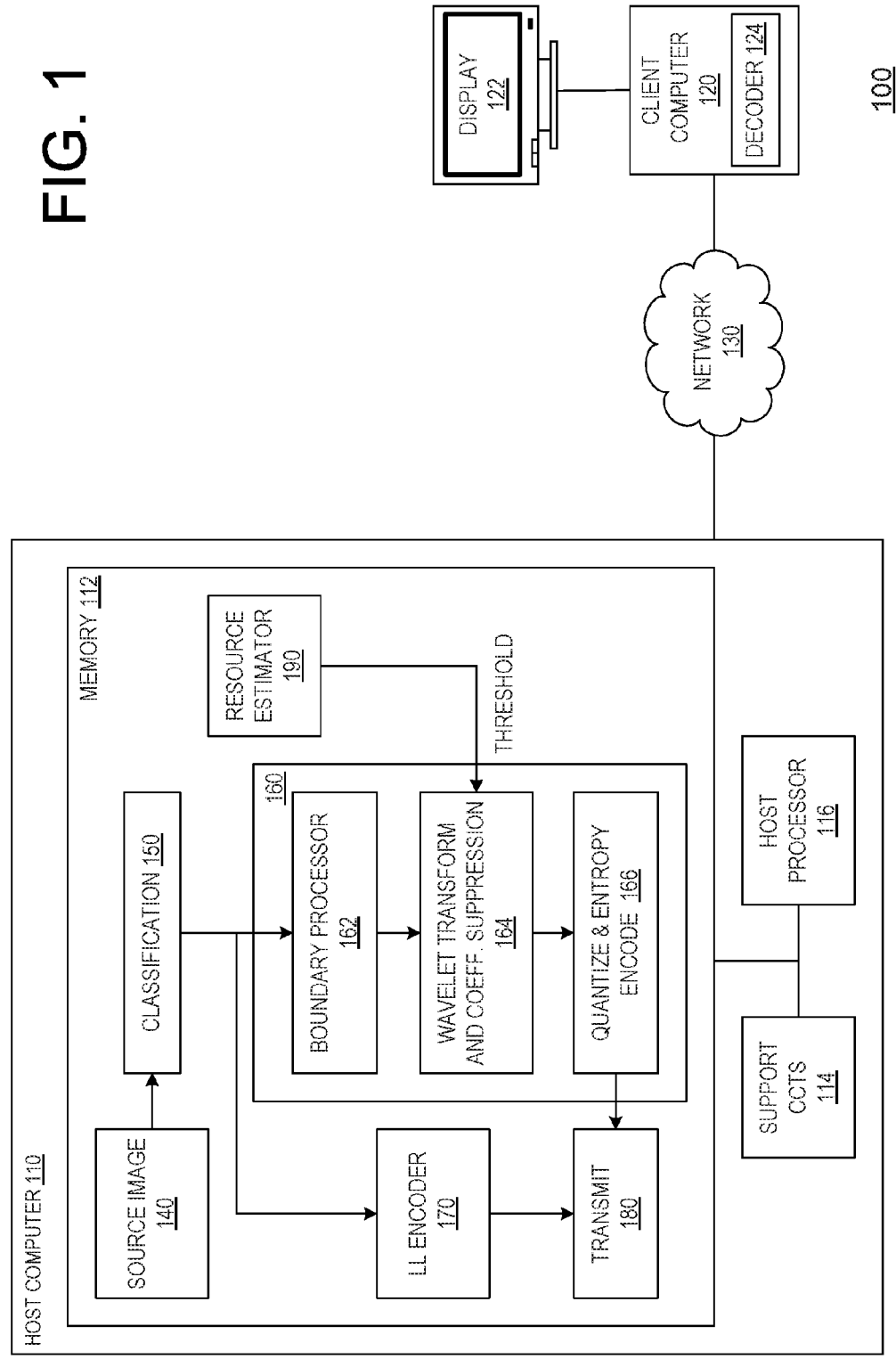
FIG. 1 illustrates selected details of an embodiment of a system comprising a host computer with an LY encoder connected to, and enabled to communicate with, a client computer.

In one or more embodiments of the present invention, a remote computing system, such as system 100 in FIG. 1, comprises a host computer coupled via a network to a client computer with a display. Software applications on the host computer, in conjunction with an operating system, produces a sequence of mixed content image updates (i.e., an image sequence comprising content such as background, text, natural images and high detail objects) rendered as pixel values to a frame buffer in system memory. Some of the content (including natural images and high detail objects) may be associated with a video player application and changes at a periodic source frame rate (e.g., 24 frames per second). Other content may change sporadically or persistently in response to user input, for example a photo viewer or word processing document under control of scroll bars or a dragged application frame.

Rather than, or in addition to, displaying the image sequence locally at the host computer, the updates to the image sequence are encoded at the host computer using a masked wavelet encoding technique as described herein and transmitted to the client computer. Content of a candidate frame of the source image (e.g. pixels, blocks, or other defined regions) is classified as either i) "LL content" (e.g. text or high contrast content) suitable for spatial domain or lossless encoding or ii) "LY content" suited to frequency domain or lossy encoding. In an embodiment, text content in an artificial image is identified as high contrasting pixels set on an artificial low contrast background or a constant color background. Furthermore, text content has a limited variety of colors (i.e. limited number of colors) and generally characterized by repeated patterns of colors. Such high contrast text pixels are typically encoded using a lossless encoding technique in the red, green and blue (RGB) color space which provides a higher compression ratio than changing the color space. High contrast text pixels may alternatively be encoded using a lossy technique although frequency domain encoding is generally avoided to prevent Gibbs ringing effects. The "LY" content (e.g. natural image content with high color diversity) is suitable for wavelet encoding.

LY content at a defined screen location is further classified as either 'changed' or 'unchanged' subsequent to previous encoding of the content at the same screen location. An unchanged region may include identical RGB pixel values in the source image. The reflection boundary on the border between LL content and changed LY content may be set at the intersection between the LL and LY content whereas in one embodiment, the reflection boundary on the border between changed and unchanged LY content is inset into the unchanged content to limit artefacts of the decoded changed LY content. In another embodiment, the reflection boundary remains on the border between changed and unchanged LY content but selective updated coefficients in the unchanged region are encoded according to coefficient influence on coefficients required to decode the changed LY content. Unchanged coefficients that do not influence the decoded changed image are suppressed.

FIG. 1 illustrates selected details of an embodiment of a remote computing system 100 ("system 100") for remote display of a computer image. System 100 comprises a host computer 110, such as a personal computer, a virtualized computer, a workstation or the like, coupled to and enabled to communicate with one or more communication endpoints, such as client computer 120, by an Internet Protocol (IP) packet network 130. In a virtualized environment such as a virtualized desktop infrastructure (VDI) or desktop-as-a-service (DaaS) deployment, system 100 comprises many client computers in communication with the host computer 110 via network 130.

Host computer 110 ("computer 110") is, generally, a computer or system of computers designated for running application software such as word processor, spreadsheet application, Computer Aided Design (CAD) software, digital photo viewer, video player software and the like, and generating a visual user interface, i.e., a source image 140 stored as an ephemeral set of pixel values in a two-dimensional memory buffer of memory 112. The source image 140 may comprise a host rendered desktop display image or a host rendered published application display image which is updated in response to events such as user input, application updates or operating system events. According to the present invention, a consecutive series of such updates to source image 140 is referred to as an 'image sequence'. The host computer 110 comprises the host processor 116 which, in various embodiments, comprises one or more central processing units (CPUs), one or more graphics processing units (GPUs), or a combination of CPU and GPU processing elements communicatively coupled to memory 112 by well-known support circuits 114 such as north bridge, south bridge, power supplies, data registers, network interface and the like that enable communications between the elements of computer 110 in addition to communications between host computer 110 and the network 130.

The classification function 150 classifies the source image 140 according to content characteristics and change status. Regions such as text, high contrast regions or background regions of color sparsity (i.e. a low color count in a defined area) are designated as 'LL' regions which are earmarked for high quality encoding (i.e. encoding to a lossless or perceptually lossless quality). Regions such as natural image content (e.g. regions of a photograph), or regions of low contrast or regions of high color variety are earmarked for 'LY' lossy encoding using the wavelet encoding techniques described herein. Classification function 150 further designates image regions as either 'changed' or 'unchanged'. After pixels of source image 140 have been updated by a drawing operation, the updated pixels are classified as 'changed' pixels. Once a 'changed' pixel or region has been encoded and transmitted (which may entail multiple progressive encoding iterations), it is re-classified as 'unchanged' until the pixel location is once again updated with a new value. This prevents retransmission of previously transmitted content. Furthermore, unnecessary CPU processing costs such as color space conversion or sum-of-absolute-difference (SAD) calculations that might result from p-frame encoding (i.e. video frame difference encoding) with zero difference are prevented. Because large desktop displays are typified by relatively small changed areas compared to a full frame image update typical of a video frame, full frame video coding is inefficient. If a video codec is deployed, significant processing is wasted in the process of identifying the unchanged regions which are inevitably subjected to 'skip' encoding.

In an embodiment, changed pixels that have been classified as LY are encoded to a specified image quality level using a progressive encoding technique. In different embodiments, the specified resting quality of the transmitted pixel may be lower than the source pixel (i.e. lossy encoding) or identical to the source pixel, i.e. progressive refinement to lossless encoding. Such progressive refinement steps may be executed in stages. For example, a changed pixel or region may be increased to a first resting quality as a priority and then the quality of individual unchanged LY content sub-regions are refined from present quality levels to higher quality levels than the changed LY content.

The LY encoder 160 comprises boundary processor 162, wavelet transform and coefficient suppression function 164, and quantization and entropy encoding function 166. LY content is typically subjected to two transformations as part of the encoding process. Initially, content is subjected to color space conversion such as RGB to YUV conversion or alternative luminance and chroma color space conversion. Secondly, the space-converted data is transformed from spatial to frequency domains. These transformations, which work well for natural images, improve the perceived image quality for a determined data bit rate by removing image content that is less visible to human perception. However, such transformations generate artifacts in high contrast computer generated image content such as text.

The boundary processor 162 determines the reflection boundary (which also may be referred to as a pixel boundary) used by wavelet transform and coefficient suppression function 164 which includes wavelet transform and coefficient suppression services. The location of the reflection boundary is dependent on both the classification status of the transform candidates and relationship (i.e. distance) of the reflection boundary to the edge of a determined wavelet tile boundary. The wavelet transform service transforms the LY regions of source image 140 into a set of wavelet coefficients using a continuous wavelet processor such as a conventional 5/3 lifting processor. The coefficient suppression service either suppresses, filters or removes specified coefficients reflected inside an LL region or inside an unchanged LY region based on the contribution of these specified coefficients to the inverse transform of the changed LY region. Alternatively the boundary processor 162 fills regions that participate in the wavelet transform but are outside of the classification boundary with coefficient data that minimizes the size of the encoded data set while also allowing the transform to proceed with the same steps as when a full image is processed. In different embodiments, such region filling is accomplished using wavelet signal extension operations such as periodic replication, mirror-image replication, zero padding or linear extrapolation.

The quantization and entropy encoding function 166 quantizes the coefficients according to quality requirements, for example as determined by resource estimator 190. In an embodiment, the resource estimator 190 evaluates network or CPU resource constraints and adjusts the quality accordingly. The quantization and entropy encoding function 166 uses an arithmetic encoder to compress the quantized coefficients.

The LL encoder 170 uses a lossless encoder such as dictionary encoder and/or a high quality lossy encoder (e.g. an H.264 Hi444 encoder) to compress regions comprising text and background content that have been designated as LL regions. Lossless embodiments of the LL encoder use dictionary encoding methods such as an historic reference encoder (e.g. Zlib) or a fixed or adaptive palette encoder or a bit mask encoder (e.g. background/text mask), or combinations of dictionary encoders.

In some embodiments, at least part of the LY encoder 160 and the LL encoder 170 are implemented as one or more hardware accelerator functions such as part of an application specific integrated circuit (ASIC) or field programmable gate array (FPGA) with access to the memory 112. Such a hardware accelerator function may comprise memory resources, image classification and encoding functions in addition to stream assembly functions for encoding and transmitting source image 140 and other source images generated by the host processor 116. In other embodiments, the LY encoder 160 and the LL encoder 170 are implemented, at least in part, as a set of machine executable instructions stored in memory 112 and executed by the host processor 116.

The transmit function 180 provides services for encapsulating and transmitting the encoded data generated by LL encoder 160 and LY encoder 170.

The network 130 comprises a communication system (e.g., local area network (LAN), wireless LAN, wide area network (WAN), and the like) that connects computer systems completely by wire, cable, fiber optic, and/or wireless links facilitated by various types of well-known network elements, such as hubs, switches, routers, and the like. In one embodiment, the network 130 may be a shared packet switched network that employs various well-known protocols (e.g., TCP/IP, UDP/IP and the like) to communicate information amongst the network resources. For example, in various embodiments, the network 130 employs part of the Internet.

The client computer 120 ("client 120") is generally any type of computing device that can connect to network 130 and decode the compressed source image for display on display 122. For example, in an embodiment, client 120 is a terminal such as a zero client, thin client, personal computer, a digital signage device or tablet device. Client 120 typically comprises one or more peripheral devices such as a mouse, keyboard or touch interface and a display 122 for presenting a remote Graphical User Interface (GUI).

The image decoder 124 ('decoder 124') of client computer 120 comprises image decoder functions such as lossless decompression, inverse quantization and inverse transform functions complementary to those of LY encoder 160 and LL encoder 170. In some embodiments, the decoder 124 is implemented, at least in part, as a set of machine executable instructions executed by the CPU of client computer 120. In other embodiments, the decoder 124 is implemented at least in part as a hardware accelerator function such as part of an application specific integrated circuit (ASIC) or field programmable gate array (FPGA) with memory and a display interface.

Figure 2:
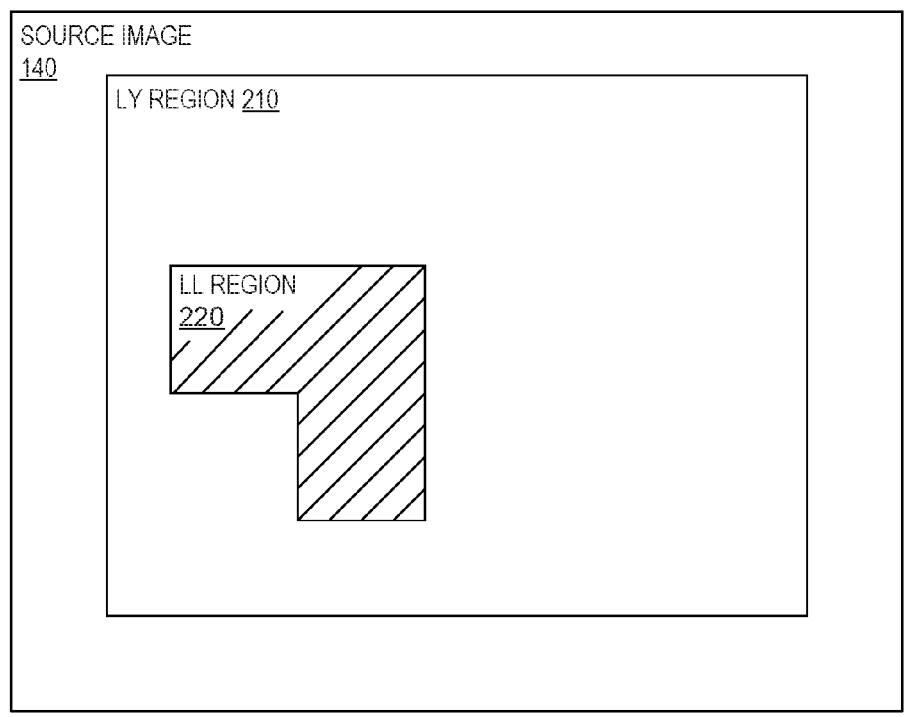
FIG. 2 illustrates a source image with classified LY and LL content regions.

FIG. 2 illustrates a conceptual depiction 200 of the source image 140 in accordance with embodiments of the present invention. The portion of the source image 140 designated as the region 210 is classified as comprising LY content. The shaded region 220 which is bounded by region 210 is classified as comprising LL content.

Figure 3:
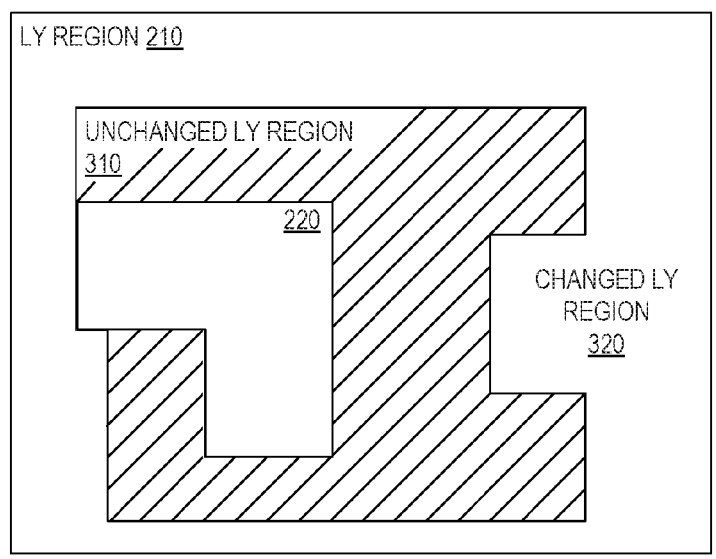
FIG. 3 illustrates an LY region further classified into unchanged and changed regions.

FIG. 3 illustrates a conceptual depiction 300 of the area comprising LY region 210 and LL region 220 in accordance with embodiments of the present invention. The region 210 is further classified into unchanged LY content region 310 shown as shaded and the remaining changed LY content region 320.

Figure 4:
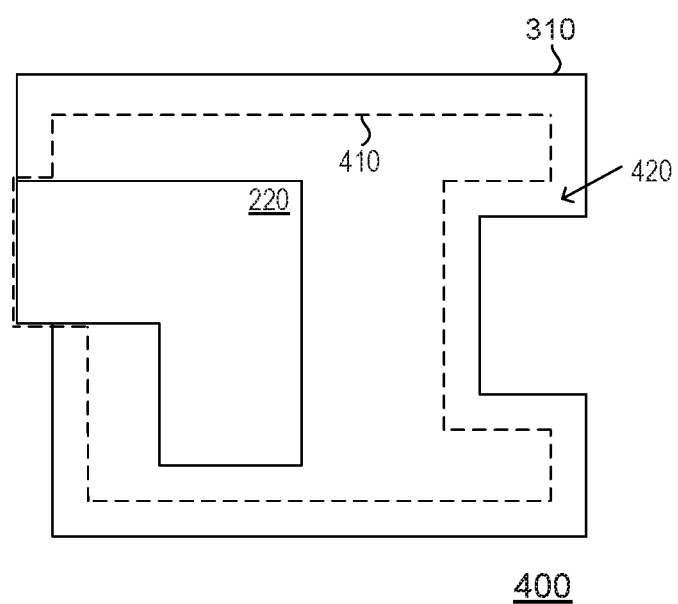
FIG. 4 illustrates a reflection boundary inset in an unchanged LY region.

FIG. 4 illustrates a conceptual depiction 400 of the area comprising unchanged LY region 310 and LL region 220 in accordance with embodiments of the present invention. A reflection boundary 410 (alternatively termed a mirror-image replication boundary) provides an image reflection boundary at which pixels or coefficients are extended during wavelet transform operations so that wavelet transforms provide minimum distortion of decoded image frames at the boundaries between discontinuous image types. Alternatives to coefficient reflection or extension include periodic replication, zero-padding, DC propagation, linear extrapolation or image wrap techniques.

The reflection boundary 410 of the embodiment shown in the depiction 400 is inset within the region 310 but not inset in the region 220. In other embodiments described herein, the reflection boundary between changed LY regions such as region 320 and unchanged LY regions such as region 310 is not adjusted as an inset along any segment. The reflection inset area 420 comprises the region between the reflection boundary 410 and the nearest perimeter to either region 310 or region 220.

In an embodiment, the refection boundary 410 is used if changed region 320 and unchanged region 310 are considered part of an image classified to comprise continuous content type. For example, boundary 410 is used in a scenario in which a computer-generated or software displayed picture in region 320 is changed but the region 310 concurrently remains unchanged over multiple frames. Such a boundary 410 enables the blending of region 320 with region 310 while minimizing the processing of the unchanged region 310. In another embodiment a reflection boundary 410 follows the line between region 320 and 310 when the regions 320 and 310 are classified as comprising separate content types (e.g. region 320 comprises video content and region 310 comprises a picture overlay). By aligning the reflection boundary 410 on the changed/unchanged boundary, the content of region 320 is prevented from bleeding into the content of region 310 as a result of an image transform function (e.g. DWT or DCT transform) crossing the boundary line. One method of determining if a change boundary should also be the reflection boundary requires consideration of the boundary length and regularity attributes. If an image change boundary is of at least a defined length and also straight, then the image change boundary likely separates different content types in which case the change boundary should match the reflection boundary. If the line is irregular in shape then the underlying content is likely contiguous in nature and the reflection boundary may be offset from the change boundary.

Figure 5:
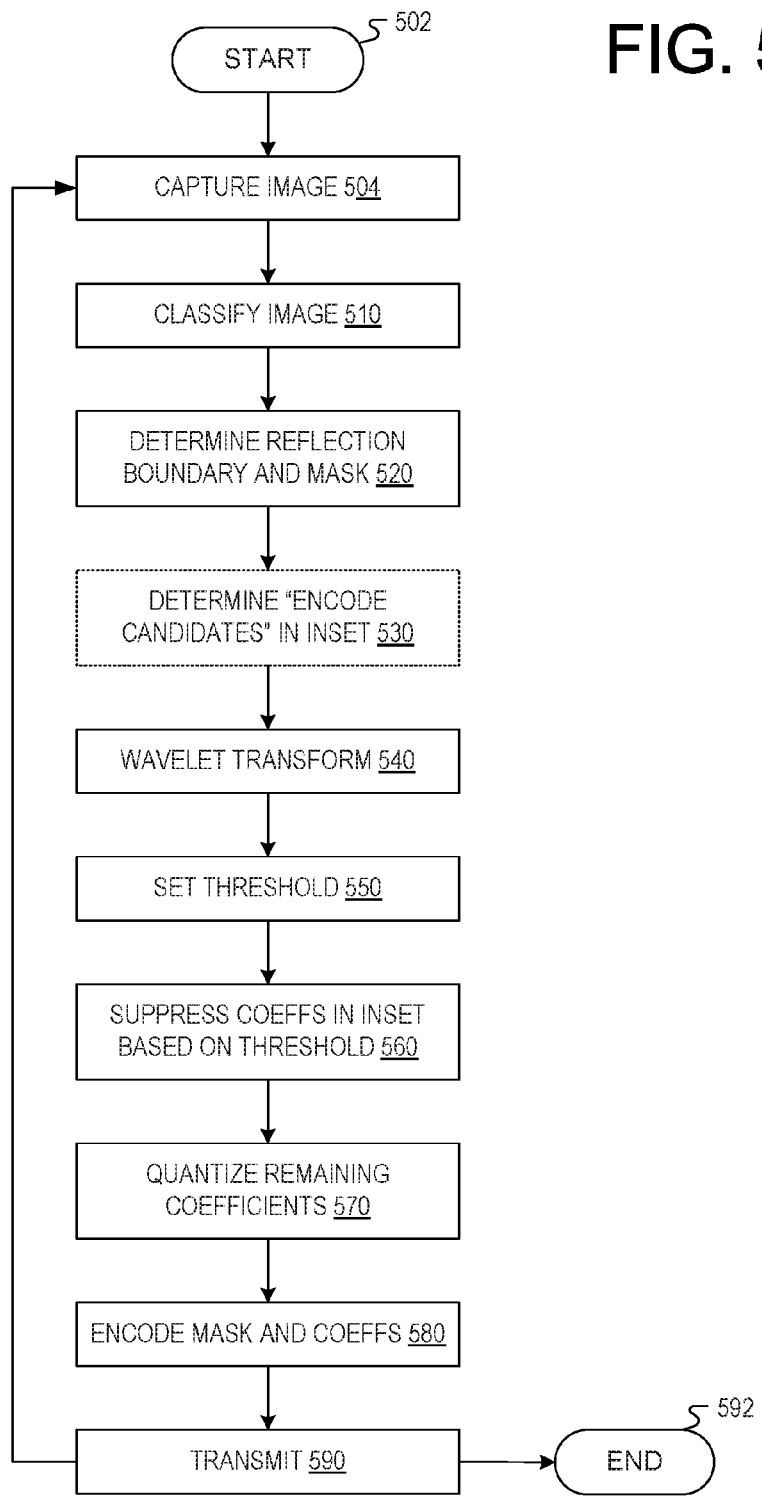
FIG. 5 illustrates a method for masked encoding of a desktop display image.

FIG. 5 illustrates an embodiment of a method 500 executed by a host processor 116 for processing changed LY image regions. Process 500 starts at step 502 and proceeds to step 504 ("Capture Image") in which source image 140 is isolated from the display image sequence, e.g. as a captured frame buffer or captured digital video signal such as a DisplayPort signal.

At step 510 ('Classify image'), the captured source image 140 is classified. Unchanged regions are identified, by comparing the captured source image 140 with a previously encoded source image frame and/or by evaluating a mask of changed pixels (or portion) which is maintained by the graphics sub-system of host processor 116. LL regions such as text or solid color backgrounds are identified using an image feature detection technique such as a text or background detection pixel filter (e.g. that detects constant color pixels and adjacent high color contrast pixels) and/or hints from the operating system that identify content type. Changed LY regions are identified by comparing color diversity (i.e. the number of different color values or absence of a constant color) of a defined region against a threshold value or by grouping the non-LL changed pixels.

At step 520 ('Determine Mask and Reflection Boundary'), reflection boundary 410 and a corresponding mask enabled to distinguish regions 320 and 420 are determined. In an embodiment, the reflection boundary comprises a combination of lines between the changed LY image and the LL image and a line within the unchanged LY image within a defined distance to a boundary between the changed and unchanged LY portions.

At step 530 ('Determine Encode Candidates in Inset'), region 420 is identified for encoding. In an embodiment, encoding candidate areas of the unchanged LY image is determined as the image between the unchanged LY image and the reflection boundary.

At step 540 ('Wavelet Transform'), the combined regions 320 and 420 are subjected to a 2D wavelet transform; e.g. performing a 2D wavelet transform on a combined image of the changed LY portion and the encoding candidate areas to generate a set of transformed coefficients. In an alternate embodiment, the entire region 310 participates in the transform and the reflection boundary 410 causes a reflection in the transform at a spatial location that matches the boundary 410. In such an embodiment, content on one side of the reflection boundary 410 does not influence the decoded image of the other side of the reflection boundary 410. This enables an increase in quality of the LY content contained by the reflection boundary 410 while additionally encoding changed image regions outside of the reflection boundary 410.

At step 550 ('Set Threshold'), the resource estimator determines quantization requirements based on available bandwidth, quality settings and area of each type of image encoding candidate; (e.g. area of region 420, region 320 and region 220 if candidates). For example, a frame to frame increase in the size of the encoded area will reduce the quality that can be achieved when operating over a constrained network. Similarly, a frame to frame reduction in the candidate encoding area enables the image quality to be increased without exceeding the available network bandwidth.

At step 560 ('Suppress Coefficients in Inset based on Threshold') coefficients that have less than a defined threshold of contribution to a decoded image of the changed lossy portion (e.g. contribution to quality as determined at step 550) are removed from the set of transformed coefficients. The contribution is determined from the coefficient transform level and the mask. In an embodiment, a reflection boundary 410 isolates transform coefficients from the influence of pixels on the other side of the boundary 410 and an entropy encoder removes the transform coefficients generated on the other side of the boundary 410 to reduce communication data overheads. In another embodiment in which frequency difference encoding is used to encode the region 420, select high frequency coefficients in the region 420 identified as not contributing to improving the image in region 320 are removed.

At step 570 ('Quantize Remaining Coefficients'), the remaining coefficients are quantized.

At step 580 ('Encode Mask and Coefficients'), an encoding of the changed LY image is generated by using entropy encoding to encode the mask determined at step 520 and the remaining transformed coefficients quantized at step 570.

At step 590 ('Transmit'), the encoded mask and coefficients are transmitted to client 120. Process 500 either returns to step 504 (i.e., if further image encoding is to be performed) or ends at step 592 ('End').

Figure 6:
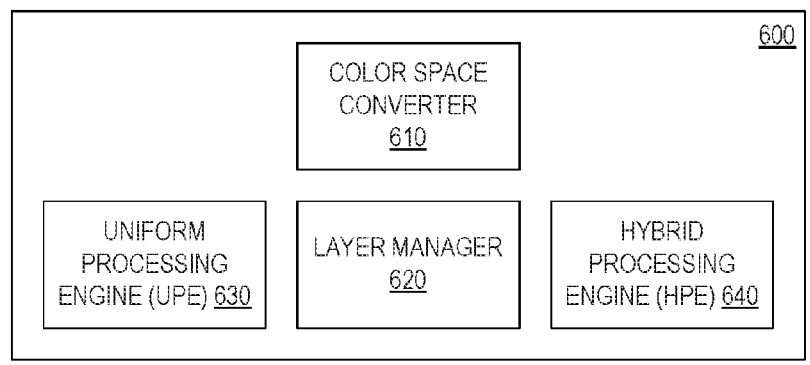
FIG. 6 illustrates a wavelet processor comprising uniform and hybrid processing engines.

FIG. 6 illustrates wavelet processor 600 which is an embodiment of the wavelet transform and coefficient suppression function 164 optimized for tile-oriented processing which is less expensive in terms of CPU and memory utilization than a pixel-wise partitioning scheme. Tile-level portioning and classification also provides an opportunity to optimize processing by skipping over unchanged tiles which reduces the per-frame processing time in addition to affording efficiency gains on memory bandwidth and network bandwidth. The wavelet processor 600 accommodates irregular-shaped changed regions without introduction of artifacts typical of other block-based encoding systems such as Discrete Cosine Transform (DCT) encoders.

The color space converter 610 prepares changed LY pixels of image 140 (i.e. region 320) for integer transform. Such pixels are typically represented as RGB values in framebuffer memory. In an embodiment, color space converter 610 converts region 320 from RGB to the reversible YCgCo color space. The layer manager 620 provides a logical separation between wavelet lifting phases by preparing input matrices for processing by the uniform processing engine (UPE) 630 and the hybrid processing engine (HPE) 640 at the base- and higher layers in the decomposition. Base layer matrices are prepared by populating boundary-adjusted areas (such as region 420 or a boundary that is adjusted into an LL region) with hallucinated RGB pixel values using hallucination techniques known to the art. Similarly, higher layer input matrices are populated with hallucinated coefficients when dependent coefficients at a lower-layer in the wavelet hierarchy do not exist due to an LL mask or unchanged pixel mask.

The layer manager 620 isolates the processing workflow, hardware architecture and instruction set used by a tile-selective frame-wide DWT transform function from the coefficient data itself. The layer manager 620 repacks irregular-shaped changed regions comprising multiple spatially isolated changed pixel areas into transform units available for concurrent iterative processing by the HPE 640.

The UPE 630 is a wavelet filter routine such as a Cohen-Daubechies-Feauveau (CDF) reversible 5/3 or 9/7 filter kernel and integer wavelet lifting transform routine that performs wavelet decomposition of a large contiguous area such as a 64×64 tile and its surrounding pixels necessary to complete a decomposition layer comprising n wavelet lifting levels. The UPE 630 executes at the maximum speed afforded by the underlying vector extensions because no conditional tile boundary coefficient transform processing decisions and operations which increase processing overheads and processing time are incorporated into the filter routine. Rather than using reflection techniques to generate coefficients along tile boundaries, conventional over-scanning is used in which pixels from neighboring tiles are accessed to complete lifting operations. In an INTEL embodiment of the host processor 116, the UPE 630 is optimized for Advanced Vector eXtension (AVX) registers such as an AVX-512 Single Instruction Multiple Data (SIMD) vector instruction set for maximum throughput of the wavelet lifting routine. In an embodiment, the UPE 630 performs conventional 5/3 lifting at each decomposition level but the routine is limited to three levels of completion, thereby transforming a 64×64 tile (i.e. a 64×64 input matrix) to an 8×8 exit matrix of level 3 (L3) coefficients. In another embodiment, the UPE 630 executes a 9/7 wavelet lifting filter.

In an embodiment, the HPE 640 is a wavelet filter routine such as a CDF 5/3 or 9/7 filter kernel and wavelet lifting routine that executes to completion by generating a single DC coefficient for a provided input matrix. In an embodiment, the HPE 640 performs wavelet decomposition of an input matrix compatible with i) the exit matrix generated by the UPE 630 and ii) the specified sub-tile dimensions used by the LY encoder 160 (e.g. an 8×8 sub-tile dimension). By using sub-tile partitions, the efficiency of large scale wavelets (e.g. 64×64) is preserved by engaging UPE 630 while simultaneously enabling high granularity of reflection boundaries between LL and LY regions (i.e. a granularity higher than 8 pixels) using HPE 640. In an embodiment in which the dimensions of the exit matrix generated by the UPE 630 differ from the sub-tile dimensions used by the LY encoder 160, separate HPE processing routines are provided for each case. In an embodiment, the HPE 640 incorporates conditional processing decisions and operations (i.e. sub-tile boundary checks) and coefficient reflection logic at a programmable interval such as every second or every forth pixel and corresponding execution points at higher levels in the decomposition. Because the number of processing decisions and operations required for the UPE 630 is less than that of the HPE 640 which requires selective coefficient reflection at sub-tile boundaries, the UPE 630 utilizes fewer SIMD vector processing instructions and takes less time to complete a transform.

Layer manager 620 provides vectorization of the exit matrices generated by the UPE 630 which enables large scale (multi-tile) wavelet decomposition to be executed to completion without boundary reflections within changed regions of an image. By engaging both the UPE 630 and the HPE 640 and adjusting tile/sub-tile sizes and corresponding number of wavelet lifting levels, the layer manager 620 is enabled to regulate i) the processing time utilized by UPE 630 and HPE 640 and ii) the granularity of tile-related image distortion (i.e. image quality). In embodiments targeted at high frame throughput (i.e. a high mega-pixels-per-second (MPPS)) or conservative CPU utilization, for example as configured via an administrative policy setting or as detected from low CPU availability metrics, the HPE 640 is configured to process larger sized sub-tiles (e.g. 16×16 sub-tiles) at an increased number of wavelet lifting levels which results in a higher frame throughput at the expense of increased block-based image distortion. In other embodiments targeted at high image quality at the expense of higher CPU utilization, the HPE 640 is configured to process smaller sub-tiles (e.g. 4×4 sub-tiles) at fewer wavelet lifting levels which provides increased granularity. In other embodiments, the sub-tile size is increased (e.g. from 8×8 to 16×16 or to 32×32) to provide increased image compression and lower network bandwidth utilization.

Figure 7:
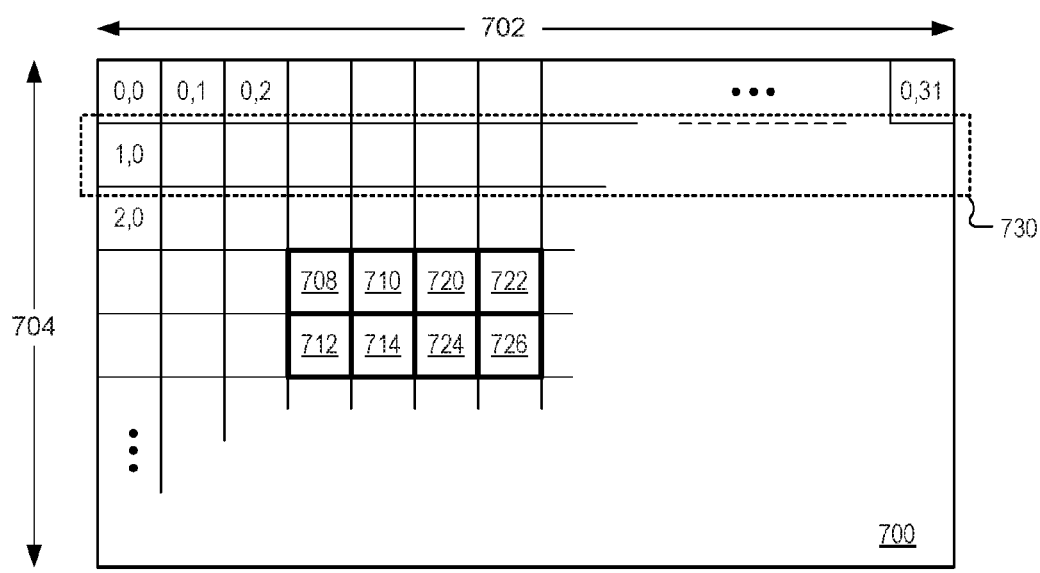
FIG. 7 illustrates the source image partitioned into full scale tiles referenced to display coordinates.

FIG. 7 illustrates a source image 700 partitioned into a grid of tiles with representative tiles 708, 710, 712, 714, 720, 722, 724 and 726, alternatively termed 'full scale' tiles herein in accordance with embodiments of the present invention. The source image 700 is an exemplary embodiment of the source image 140 suited to tile-partitioned and layered wavelet compression using the processing engines 630 and 640. The source image 700 is partitioned into tiles, each comprising a 64×64 dimension such that regions may be identified as either changed or unchanged at a tile level of granularity. In an embodiment, the source image 700 complies with the Digital Cinema Initiative (DCI) image resolution standard, with a horizontal dimension 702 of 2048 pixels and a vertical dimension 704 of 1080 pixels which is readily partitioned into 32×16 unit tiles, each tile comprising 64×64 pixels. In the case of DCI, some 56 rows of pixels remain unpartitioned. In other embodiments, the source image 700 is partitioned into unit tiles of alternative dimensions using smaller and/or larger tile sizes (e.g. 32×32 or 128×128) or rectangular tiles (e.g. 64 pixels×32 pixels), or a dynamically adjusted granularity optimized to match the memory and processing capabilities of host computer 110 and/or the scale of features present in the source image 140. Slice 730 comprises a row of 32 tiles suitable for optimized transform using an AVX-512 instruction set. In an embodiment, an AVX instruction routine is applied to simultaneously processing co-located 16-bit pixel coefficients in each of the 32 tiles of slice 730. In other embodiments, full scale tiles are suitably sized to support a desired system throughput (e.g. 120, 240 or 480 mega-pixels per second) for a target host processor 116 or hardware accelerated encoding resource while also minimizing memory bandwidth bottlenecks. It is also easier to predict and maintain target quality ranges using larger tile sizes. For example, maintaining an evenly distributed reduced quality range across source image 700 under bandwidth constraint is easier using large tiles.

Figure 8:
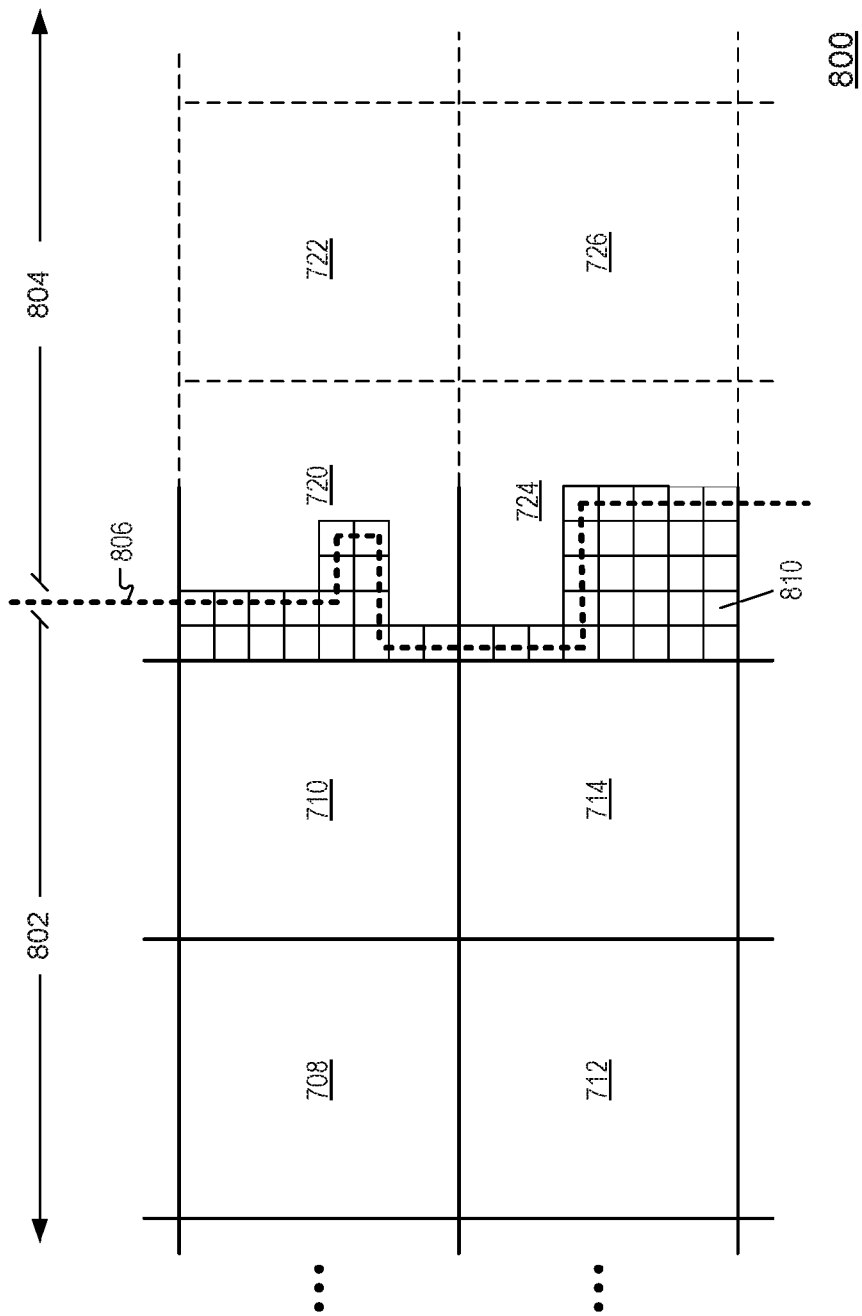
FIG. 8 illustrates a partial area of the source image where the LY region shares a boundary with the LL region.

FIG. 8 illustrates a tiled area 800 of a source image in which a pixel boundary 806 separates region 802 from region 804 in accordance with embodiments of the present invention. The region 802 is designated for frequency domain encoding (e.g. an LY region) and the region 804 is, in different embodiments, either designated for spatial domain encoding (e.g. an LL region) or comprises a previously encoded and unchanged region. The tiles 708, 710, 712 and 714 which are characterized entirely by LY pixels are maintained as full scale 'uniform' tiles (e.g. as specified in a tile mask) designated for a layered wavelet compression, of which lower levels in the wavelet transform are performed using a uniform processing engine. The 'hybrid' tiles 720 and 724 are full scale tiles characterized by both LY and unchanged LL pixels. The changed LY portions in region 802 are partitioned into a second grid of sub-tiles (ref sub-tile 810) designated for sub-tile wavelet transform using HPE 640. The tiles 722 and 726 are full-scale unchanged or LL tiles which are masked from wavelet processing. In an embodiment, the tiles 720 and 724 are 64×64 full scale tiles partitioned into sub-tiles of 8×8 pixels but sub-tiles of different sizes may be used in alternative embodiments.

Figure 9:
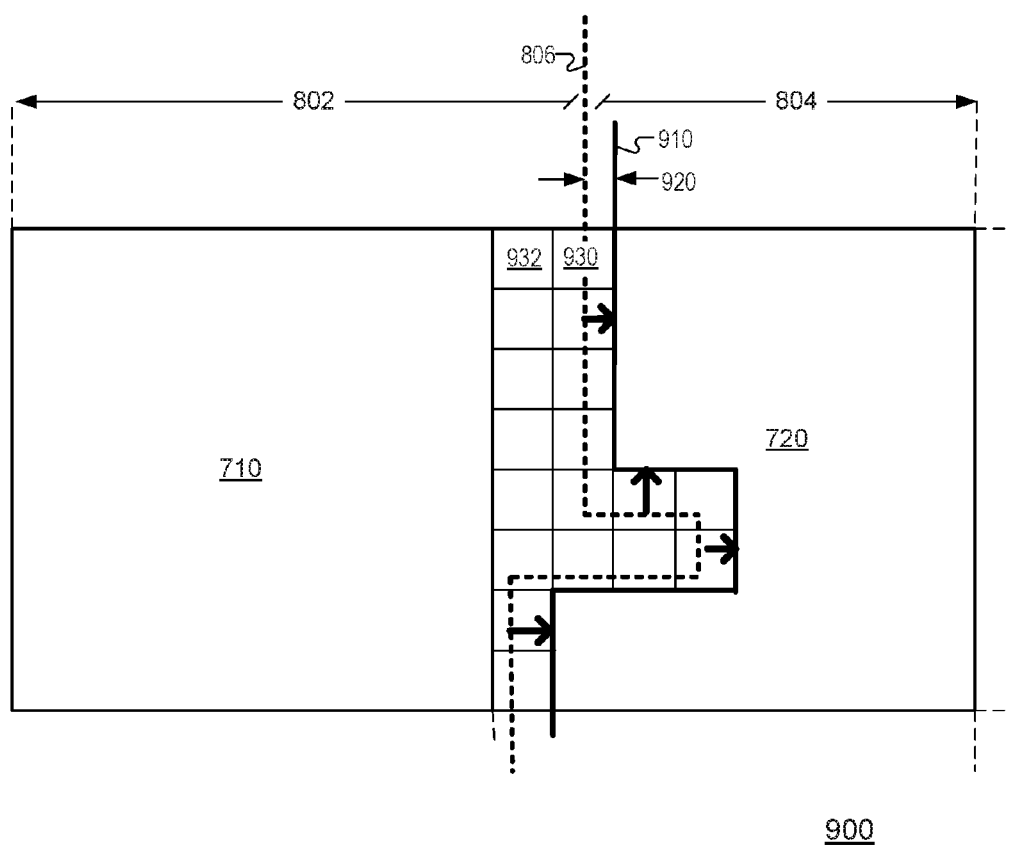
FIG. 9 illustrates a changed pixel boundary and corresponding adjusted boundary between sub-tiles.

FIG. 9 illustrates a tiled region 900 of a source image comprising the LY changed full scale uniform tile 710 adjacent to the hybrid tile 720 in accordance with embodiments of the present invention. The pixel boundary 806 is adjusted to sub-tile boundary 910 within the region 804 which enables processing of LY pixels in the hybrid tile 720 at sub-tile granularity (e.g. 8×8 blocks) using the HPE 640. In instances where both regions 802 and 804 are changing, sub-tiling minimizes the number of LY pixels required for reclassification (as LL pixels) to prevent distortion of region 804 during the transform process. In an embodiment, the boundary line 806 is extended outward pixel-wise by row and column to the nearest sub-tile boundary in the x and y directions wherever pixel boundary 806 is not already located on a sub-tile boundary. The binary pixel mask that specifies the changed region 802 and the unchanged region 804 is updated to include the pixels in the gap 920. By realigning the boundary 806 to include pixels in the gap 920, the changed LY region 802 is extended to include both remainder LY sub-tiles beyond the nearest 64×64 tile boundary in addition to hybrid LY/LL sub-tiles. These sub-tiles are designated as hybrid transform units for wavelet decomposition using the HPE 640. In addition to LY transform and encoding, changed pixels between boundaries 806 and 910 may also be subjected to an LL encoding process and overlaid on the decoded LY pixels or substituted by decoder 124 during client image composition.

Figure 10:
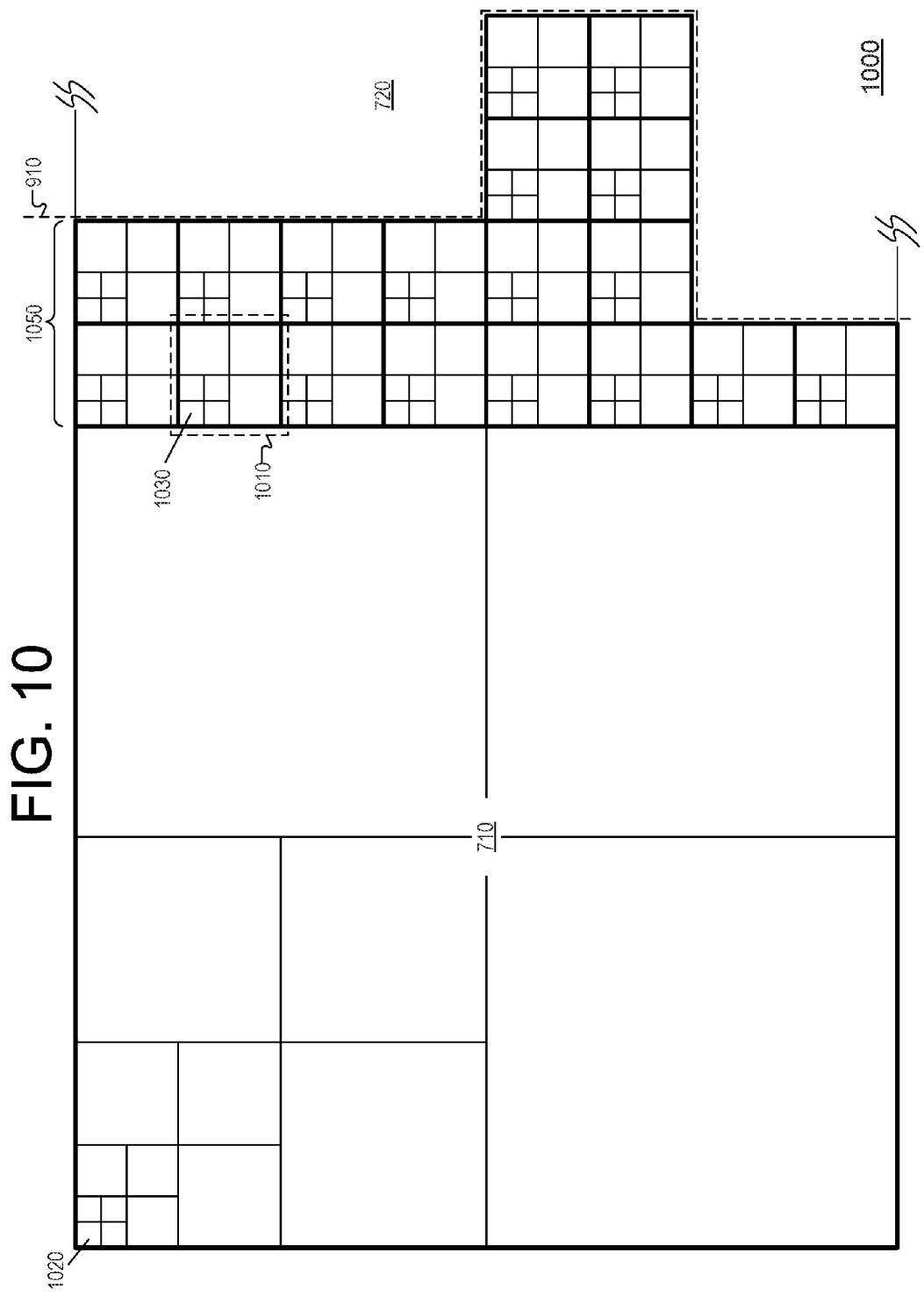
FIG. 10 illustrates a wavelet transformed full-scale uniform tile and adjacent set of wavelet transformed hybrid sub-tiles.

FIG. 10 illustrates a region 1000 comprising the full-scale uniform tile 710 adjacent to the sub-tiles of hybrid tile 720 following a wavelet transform in accordance with embodiments of the present invention. The sub-tiles in region 1050 including representative sub-tile 1010 are transformed following reallocation of region 1050 using pixel boundary expansion described for FIG. 9. In an embodiment uniform tile 710 of 64×64 pixels is transformed via 6 wavelet lifting iterations (of which five stages are depicted in FIG. 10) in two layers under control of layer manager 620. The first three wavelet lifting iterations in the first layer are executed by the UPE 630 which generates an 8×8 exit matrix. The second layer comprises the final three lifting iterations executed by the HPE 640 to generate a single DC value in the coefficient location 1020.

The sub-tiles associated with hybrid tile 720 (including exemplary 8×8 sub-tile 1010) are also transformed in two layers under control of layer manager 620. In the first layer, the sub-tiles are transformed via 3 lifting iterations (of which two stages are shown) using the HPE 640 to achieve a single DC value in the coefficient (ref coefficient 1030 for the sub-tile 1010). The boundary 910 which separates identified sub-tiles in tile 720 from unchanged or LL regions is used as a reflection boundary for transform completion. After the sub-tiles in region 1050 have been transformed, layer manager 620 initiates a second layer of transforms by configuring the collection of DC coefficients (ref. DC coefficient 1030) and any necessary hallucinated coefficients as an input matrix for consumption by the HPE 640. The HPE 640 transforms higher levels of block 720 (above the single stage shown) to completion. Resultant coefficients underneath the unchanged pixel mask in tile 720 that do not contribute to the decoded region 1050 are filtered, suppressed or removed prior to encoding.

Figure 11:
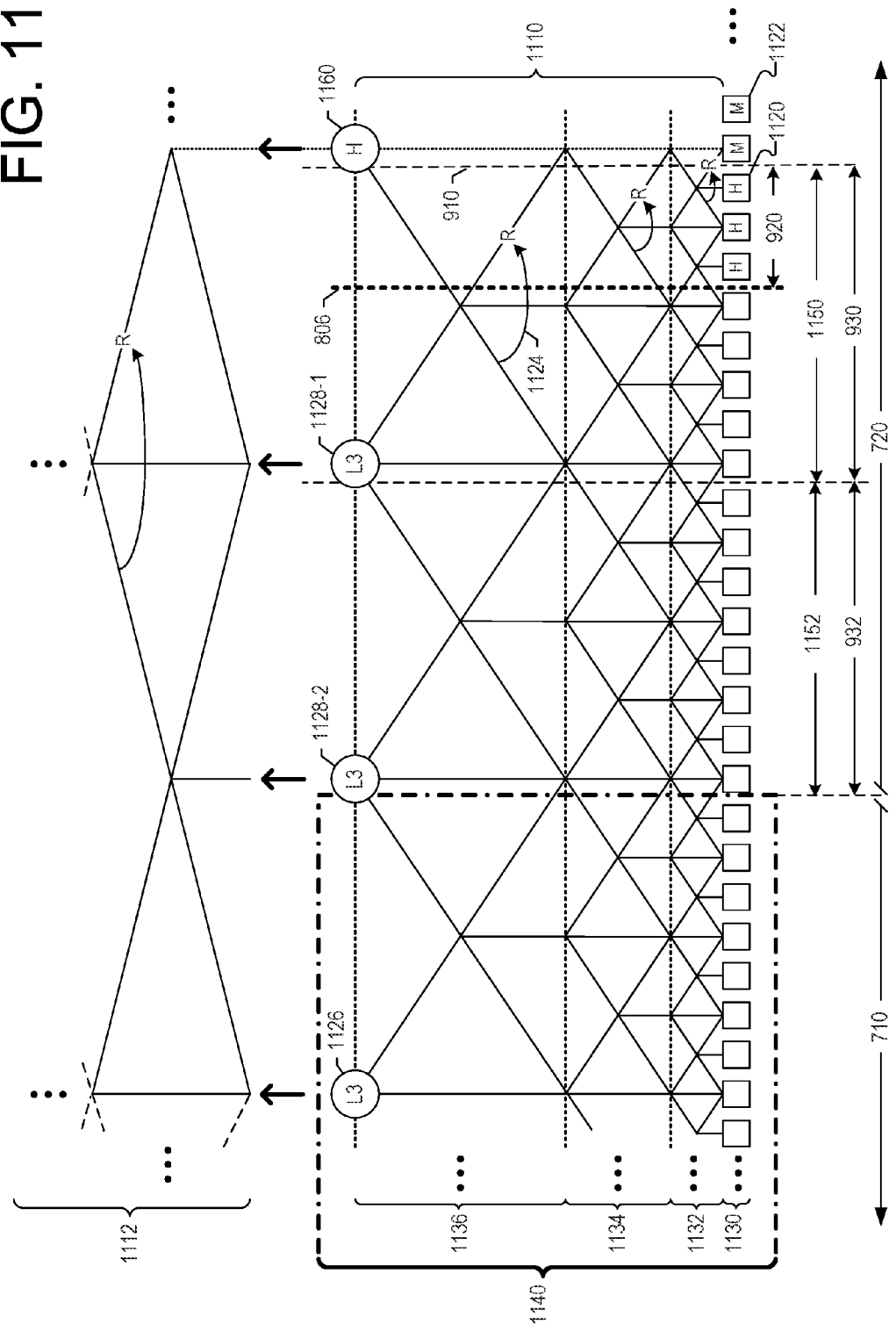
FIG. 11 illustrates a dual layer wavelet decomposition for a changed LY portion of an image adjacent to a masked LL region of the image.

FIG. 11 illustrates a partial view of a two layer wavelet decomposition for an exemplary row dissection across the tiles 710 and 720, including the 8×8 sub-tiles 930 and 932. At the base layer 1110, three levels of wavelet decomposition 1132, 1134 and 1136 are depicted for pixels 1130 in accordance with embodiments of the present invention. The hybrid transform unit (T.U.) 1150 is constructed from the sub-tile 930 by moving the boundary 806 to the nearest divisible sub-tile boundary 910 which includes the LL pixels in gap 920. 'H' Pixel 1120 and others in gap 920 are replaced with hallucinated values to prevent LL artifacts in region 804 from bleeding into the LY region 802. LL Pixels in region 804 outside the hybrid transform unit 1150 (ref 'M' pixel 1122) are masked out in the changed pixel mask and therefore not subject to wavelet decomposition. At successive levels in the transform, a conventional coefficient reflection method (ref 'R' reflection 1124) is used to substitute masked coefficients necessary during wavelet lifting operations. The hybrid transform unit 1152 is constructed directly from the sub-tile 932 and wavelet lifting to L3 1128-2 is accomplished without reflections using neighboring pixels and coefficients from previously calculated levels in the decomposition.

At the base layer 1110, the uniform transform unit 1140 of tile 710 (partially shown) and the sub-tile transform units 1150 and 1152 associated with tile 720 are subjected to three levels of wavelet lifting. Uniform transform unit 1140 is processed using the UPE 630, generating coefficient 1126 (and others for transform unit 1140) whereas the hybrid transform units 1150 and 1152 are processed using the HPE 640, generating L3 DC coefficients 1128-1 and 1128-2 respectively.

At the second layer 1112, an 8×8 hybrid transform unit is designated to accommodate the L3 coefficients in the exit matrix resultant from processing the transform unit 1140 and the second layer 8×8 hybrid transform unit is processed to completion (i.e. a single DC coefficient at the highest decomposition level). The L3 coefficients generated from transform units 1150 and 1152 are augmented with hallucinated coefficients representing data in the masked region 804 (ref hallucinated coefficient 1160) and also processed to completion using the HPE 640.

Figure 12:
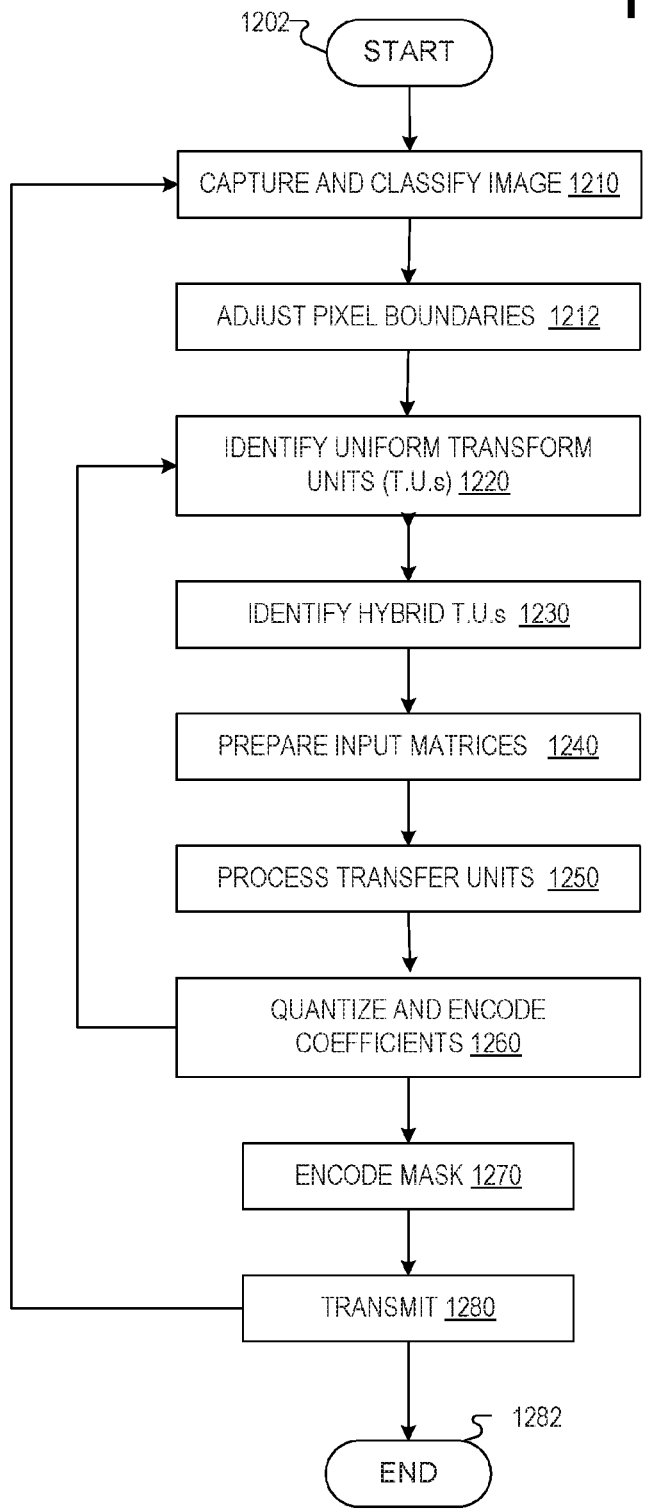
FIG. 12 illustrates a method for compressing an image using a dual layer technique.

FIG. 12 illustrates a multi-layer method 1200 for wavelet transform and encoding of a tiled source image 700 in accordance with embodiments of the present invention. Method 1200 starts at step 1202 and proceeds to step 1210 ("Capture and Classify Image") in which the source image is captured and classified according to change status (i.e. changed or unchanged) and image type, i.e. LY pixels designated for frequency domain encoding or LL pixels designated for spatial domain encoding. In an embodiment, unchanged portions of the source image are determined by identifying exact matches in the spatial domain between RGB pixel values in the source image 700 and RGB pixel values at corresponding locations in a previous captured frame that have already been encoded.

Method 1200 proceeds to step 1212 ("Adjust Pixel Boundaries") in which full-scale changed LY tiles and sub-tiles are identified. Pixel boundaries of hybrid sub-tiles comprising both changed LY pixels and masked pixels (comprising unchanged pixels or LL pixels in different embodiments) are adjusted to sub-tile boundaries (ref boundary 910).

Method 1200 proceeds to step 1220 ("Identify Uniform Transform Units") in which full-scale changed LY tiles suited for uniform processing are designated as uniform transform units (ref. T.U. 1140).

Method 1200 proceeds to step 1230 ("Identify Hybrid T.Us") in which hybrid T.Us are designated including: i) at the base layer hybrid sub-tiles (ref. sub-tile 930) and remainder sub-tiles (ref. sub-tile 932) designated as hybrid transform units (ref T.Us 1150 and 1152) and ii) at an upper layer exit matrices are designated from recently completed lower layers. In an embodiment, a uniform T.U. at the base layer (or the immediate lower layer) generates an exit matrix which can be used directly as a hybrid T.U. at the current layer. The DC coefficients generated from hybrid T.Us at the lower layer are designated for aggregation.

Method 1200 proceeds to step 1240 ("Prepare Input Matrices") in which pixel values within adjusted boundaries (ref pixel 1120) in the base layer are hallucinated in the input matrix. At higher layers, DC coefficients generated from hybrid T.Us at the lower layer are aggregated in an input matrix and missing coefficients augmented with hallucinated coefficients (ref. coefficient 1140).

Method 1200 proceeds to step 1250 ("Process Transfer Units") in which the T.Us prepared at step 1240 are processed. In an embodiment, uniform T.U.s are processed by UPE 630 and hybrid T.Us are processed by HPE 640.

Method 1200 proceeds to step 1260 ("Quantize and Encode Coefficients") in which the coefficients of completed transforms are quantized according to quality requirements and encoded using a suitable coefficient encoder known to the art such as a GRoup Encoding of Wavelet Precision (GREWP) or Set Partitioning in Hierarchical Trees (SPIHT) or Embedded Zerotrees of Wavelets (EZW) encoder.

The method 1200 returns to step 1220 to process exit matrices generated by the UPE 630. In an embodiment, the method 1200 proceeds to step 1270 once each changed LY 64×64 tile (including uniform and hybrid tiles) has been decomposed to a single DC coefficient (i.e. one DC coefficient per tile). In another embodiment, these DC coefficients are further aggregated and additional layers processed by returning to step 1220. For example, in the base layer, sixty-four tiles arranged in an 8×8 square, each tile comprising a 64×64 uniform T.U. is decomposed to an 8×8 exit matrix. At the second layer, each of the sixty-four 8×8 hybrid transform units is transformed to a DC coefficient. At the third layer, the remaining sixty four DC coefficients are aggregated as a hybrid T.U. and processed to a single DC value. If additional coefficients at a higher decomposition scales are desired, method 1200 returns to step 1220.

Method 1200 proceeds to step 1270 ("Encode Mask") in which a binary mask that specifies changed and unchanged regions as distinguished by the sub-tile boundary 910 is compressed using an encoder such as a Joint Bi-level Image Experts Group (JBIG) encoder.

Method 1200 proceeds to step 1280 ("Transmit") in which encoded coefficients generated at step 1260 and the binary mask encoded at step 1270 are transmitted to the client computer 120. If an additional source image frame is available for processing, method 1220 returns to step 1210, otherwise method 1200 exits at step 1282 ("End").

While the foregoing is directed to embodiments of the present invention, other and further embodiments of the invention may be devised without departing from the basic scope thereof, and the scope thereof is defined by the claims that follow.

The invention claimed is:

1. A method of transmitting a computer display image, comprising:
    determining a pixel boundary for a changed portion of the computer display image designated for encoding, the pixel boundary referenced to a sub-tile boundary within a grid of tiles;
    identifying i) a uniform tile within the changed portion referenced to a first tile in the grid and ii) at least one hybrid sub-tile within the changed portion referenced to a second tile adjacent to the first tile, the at least one hybrid sub-tile associated with the sub-tile boundary;
    engaging a single instruction multiple data (SIMD) vector processor to:
        transform the uniform tile to an exit matrix via a uniform processing routine comprising first wavelet lifting exclusive of conditional tile boundary coefficient transformation;
        transform the at least one hybrid sub-tile to at least one DC coefficient via a hybrid processing routine comprising second wavelet lifting inclusive of conditional sub-tile boundary processing instructions; and
        transform the exit matrix to a first DC coefficient and the at least one DC coefficient to a second DC coefficient via the hybrid processing routine;
    quantizing, encoding and transmitting coefficients of the first and second tiles; and
    encoding and transmitting a binary mask specification for the changed portion adjusted to the sub-tile boundary.

2. The method of claim 1 wherein the pixel boundary is realigned, from differentiating the changed portion from an unchanged portion within the at least one hybrid sub-tile, to create the sub-tile boundary along an edge of the at least one hybrid sub-tile.

3. The method of claim 2 wherein the at least one hybrid sub-tile comprises i) changed pixels of the changed portion designated for the second wavelet lifting and ii) unchanged pixels of the unchanged portion.

4. The method of claim 3 wherein the unchanged pixels are substituted with hallucinated values prior to the transform of the at least one hybrid sub-tile.

5. The method of claim 4 wherein the number of levels in the first wavelet lifting and the number of levels in the second wavelet lifting levels are adjusted to regulate at least one of i) image quality distortion associated with the hallucinated values, and ii) processing time of the uniform processing routine and the hybrid processing routine.

6. The method of claim 2 wherein the unchanged portion comprises pixels previously processed by a spatial domain encoder.

7. The method of claim 2 wherein identifying the unchanged portion comprises identifying exact matches between first pixels of the computer display image and corresponding second pixels of a previous frame of the computer display image in a Red, Green and Blue (RGB) spatial domain.

8. The method of claim 1 wherein the first and second wavelet lifting comprise a CDF 5/3 reversible integer wavelet lifting filter.

9. The method of claim 1 wherein the uniform processing routine uses three wavelet lifting levels to generate the exit matrix and the hybrid processing routine uses three wavelet lifting levels to generate the at least one DC coefficient.

10. The method of claim 1 wherein the uniform processing routine uses over-scan into neighboring tiles to generate tile boundary coefficients at a first boundary of the first tile and the hybrid processing routine uses reflection to generate sub-tile boundary coefficients at a second boundary of the at least one hybrid sub-tile.

11. The method of claim 10 wherein the reflection comprises at least one of a set of wavelet signal extension operations comprising periodic replication, mirror-image replication, zero padding or linear extrapolation.

12. The method of claim 1 wherein the coefficients of the first and second tiles include the first DC coefficient and the second DC coefficient.

13. The method of claim 1 wherein a first number of processing decisions and operations required for the uniform processing routine is less than a second number of processing decisions and operations required for the hybrid processing routine and wherein the second number of processing decisions and operations is required for selective coefficient reflection at sub-tile boundaries.

14. The method of claim 13 wherein the first number of processing decisions and operations takes less time of the SIMD vector processor than the second number of processing decisions and operations.

15. The method of claim 1 wherein each tile in the grid comprises a second grid of sub-tiles.

16. An apparatus for transmitting a computer display image, comprising:
a host computer, comprising a single instruction multiple data (SIMD) vector processor, for:
determining a pixel boundary for a changed portion of the computer display image designated for encoding, the pixel boundary referenced to a sub-tile boundary within a grid of tiles;
identifying i) a uniform tile within the changed portion referenced to a first tile in the grid and ii) at least one hybrid sub-tile within the changed portion referenced to a second tile adjacent to the first tile, the at least one hybrid sub-tile associated with the sub-tile boundary;
transforming, using the SIMD vector processor, the uniform tile to an exit matrix via a uniform processing routine comprising first wavelet lifting exclusive of conditional tile boundary coefficient transformation;
transforming, using the SIMD vector processor, the at least one hybrid sub-tile to at least one DC coefficient via a hybrid processing routine comprising second wavelet lifting inclusive of conditional sub-tile boundary processing instructions;
transforming, using the SIMD vector processor the exit matrix to a first DC coefficient and the at least one DC coefficient to a second DC coefficient via the hybrid processing routine;
quantizing, encoding and transmitting coefficients of the first and second tiles; and
encoding and transmitting a binary mask specification for the changed portion adjusted to the sub-tile boundary.

17. The apparatus of claim 16 wherein the pixel boundary is realigned, from differentiating the changed portion from an unchanged portion within the at least one hybrid sub-tile, to create the sub-tile boundary along an edge of the at least one hybrid sub-tile.

18. The apparatus of claim 16 wherein the uniform processing routine uses three wavelet lifting levels to generate the exit matrix and the hybrid processing routine uses three wavelet lifting levels to generate the at least one DC coefficient.

19. The apparatus of claim 16 wherein the uniform processing routine uses over-scan into neighboring tiles to generate tile boundary coefficients at a first boundary of the first tile and the hybrid processing routine uses reflection to generate sub-tile boundary coefficients at a second boundary of the at least one hybrid sub-tile.

20. The apparatus of claim 16 wherein a first number of processing decisions and operations required for the uniform processing routine is less than a second number of processing decisions and operations required for the hybrid processing routine and wherein the second number of processing decisions and operations is required for selective coefficient reflection at sub-tile boundaries.

\* \* \* \* \*